United States Patent
Finn et al.

(10) Patent No.: US 9,372,821 B2
(45) Date of Patent: Jun. 21, 2016

(54) LIMITED FUNCTIONALITY LINK STATE PROTOCOL NODE

(71) Applicants: Norman William Finn, Livermore, CA (US); Lester C. Ginsberg, Mount Hermon, CA (US)

(72) Inventors: Norman William Finn, Livermore, CA (US); Lester C. Ginsberg, Mount Hermon, CA (US)

(73) Assignee: Cisco Technology, Inc., San Jose, CA (US)

(*) Notice: Subject to any disclaimer, the term of this patent is extended or adjusted under 35 U.S.C. 154(b) by 300 days.

(21) Appl. No.: 13/900,681

(22) Filed: May 23, 2013

(65) Prior Publication Data

US 2014/0351465 A1    Nov. 27, 2014

(51) Int. Cl.
   G06F 13/42    (2006.01)
   H04L 12/751    (2013.01)

(52) U.S. Cl.
   CPC ............... G06F 13/42 (2013.01); H04L 45/02 (2013.01)

(58) Field of Classification Search
   CPC ........ G06F 13/42; H04L 45/02; H04L 45/021
   See application file for complete search history.

(56) References Cited

U.S. PATENT DOCUMENTS

| | | | |
|---|---|---|---|
| 8,675,522 B2 | 3/2014 | Keesara et al. | |
| 8,743,875 B2 | 6/2014 | Khera et al. | |
| 2005/0160179 A1* | 7/2005 | Retana | H04L 45/02 709/238 |
| 2006/0050741 A1* | 3/2006 | Shabtay et al. | 370/492 |
| 2006/0159082 A1* | 7/2006 | Cook et al. | 370/389 |
| 2009/0116514 A1 | 5/2009 | Yan et al. | |
| 2010/0128638 A1* | 5/2010 | Navas et al. | 370/254 |
| 2014/0149819 A1* | 5/2014 | Lu | H04L 45/021 714/748 |

FOREIGN PATENT DOCUMENTS

WO    2008/087543 A1    7/2008

OTHER PUBLICATIONS

Ross W. Callon, "Use of OSI ISIS for Routing in TCP/IP and Dual Environments," RFC 1195, Dec. 1990, The Internet Society, Reston, VA, USA (eighty-five pages).

Fedyk et al., "IS-IS Extensions Supporting IEEE 802.1aq Shortest Path Bridging," RFC 6329, Apr. 2012, The Internet Society, Reston, VA, USA (thirty-seven pages).

PCT International Search Report and Written Opinion, PCT Application PCT/US2014/032308, ISA/EP, European Patent Office, Netherlands, mailed Sep. 4, 2014 (twelve pages).

(Continued)

*Primary Examiner* — Glenn A Auve
(74) *Attorney, Agent, or Firm* — The Law Office of Kirk D. Williams

(57) ABSTRACT

In one embodiment a limited functionality link state protocol node has one or two interfaces configured to send and receive link state protocol packets. In response to receiving, by the partially-participating link state protocol node on a first interface, a particular link state protocol data unit (LSP): sending the particular LSP from a second interface of the partially-participating link state protocol node without updating the local link state database when the second interface is currently participating in the link state protocol distribution; and sending an acknowledgment of the particular LSP from the first interface when the second interface is not currently participating in the link state protocol distribution.

11 Claims, 4 Drawing Sheets

(56) References Cited

OTHER PUBLICATIONS

"Information technology—Telecommunications and information exchange between systems—Intermediate System to Intermediate System intra-domain routeing information exchange protocol for use in conjunction with the protocol for providing the connectionless-mode network service (ISO 8473)," 10589, Second Edition, Nov. 15, 2002, ISO/IEC Switzerland (two hundred ten pages).

"Media Access Control (MAC) Bridges and Virtual Bridged Local Area Networks—Amendment 20: Shortest Path Bridging," IEEE Standard for Local and metropolitan area networks, IEEE Std 802.1aq-2012, IEEE Computer Society, New York, NY, Jun. 29, 2012 (three hundred forty pages).

* cited by examiner

LIMITED FUNCTIONALITY LINK STATE PROTOCOL NODE

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Intermediate System to Intermediate System (IS-IS) is a routing protocol designed to move connectivity/link state information efficiently within a network. The base specification for IS-IS is "Information technology—Telecommunications and information exchange between systems—Intermediate System to Intermediate System intra-domain routing information exchange protocol for use in conjunction with the protocol for providing the connectionless-mode network service (ISO 8473)," ISO/IEC 10589 (Nov. 15, 2002).

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
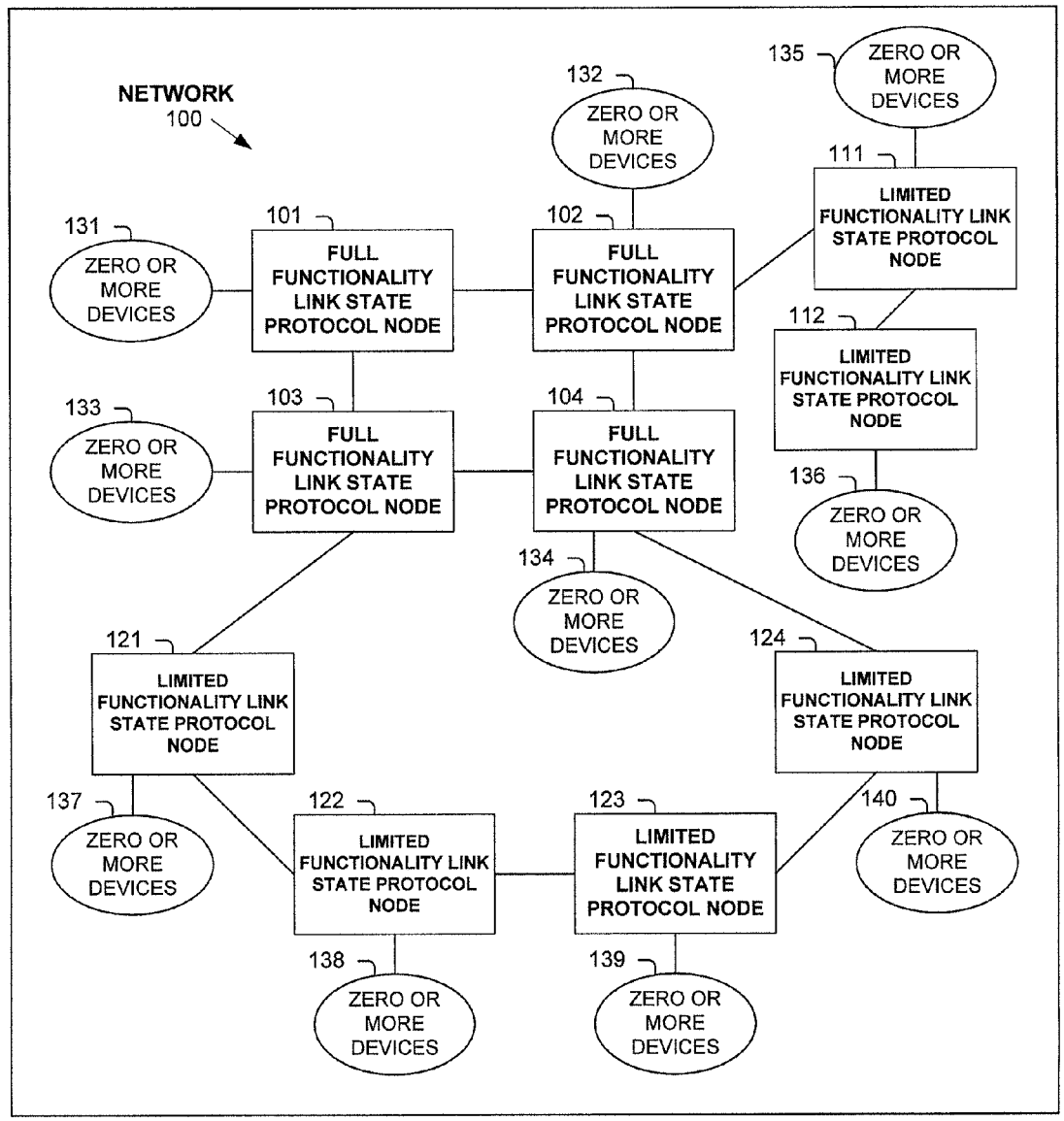
FIG. 1 illustrates a network operating according to one embodiment.

Disclosed are, inter alia, methods, apparatus, computer-storage media, mechanisms, and means associated with a limited functionality link state protocol node. One embodiment includes a partially-participating link state protocol node, comprising: storage configured to store a local link state database; one or two interfaces configured to send and receive link state protocol packets; and one or more processing elements configured to: (a) send a particular link state protocol data unit (LSP) from a second interface of said one or two interfaces without updating the local link state database in response to receiving the particular link state protocol data unit (LSP) on a first interface of said one or two interfaces when the second interface is currently participating in the link state protocol distribution; and (b) send an acknowledgment of the particular LSP from the first interface when said one or two interfaces consist of one interface such that there is no second interface currently participating in the link state protocol distribution.

2. Description

Disclosed are, inter alia, methods, apparatus, computer-storage media, mechanisms, and means associated with a limited functionality link state protocol node. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing said read value—the value is obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment includes, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with a limited functionality link state protocol node. One embodiment includes a partially-participating link state protocol node, comprising: storage configured to store a local link state database; one or two interfaces configured to send and receive link state protocol packets; and one or more processing elements configured to: (a) send a particular link state protocol data unit (LSP) from a second interface of said one or two interfaces without updating the local link state database in response to receiving the particular link state protocol data unit (LSP) on a first interface of said one or two interfaces when the second interface is currently participating in the link state protocol distribution; and (b) send an acknowledgment of the particular LSP from the first interface when said one or two interfaces consist of one interface such that there is no second interface currently participating in the link state protocol distribution.

In one embodiment, the link state protocol is Intermediate System to Intermediate System (IS-IS). In one embodiment, the network is an IEEE 802.1aq Shortest Path Bridging (SPB) network. In one embodiment, the partially-participating link state protocol node is configured to maintain in the local link state database only its own LSPs. In one embodiment, said one or two interfaces configured to send and receive link state protocol packets consists of exactly two interfaces currently participating in the link state protocol distribution. In one embodiment, said one or two interfaces configured to send and receive link state protocol packets consists of exactly one interface currently participating in the link state protocol distribution. In one embodiment, the partially-participating link state protocol node is configured to generate and send an LSP and not to wait for an acknowledgement of said sent particular own LSP.

One embodiment includes a method, comprising: maintaining, by a partially-participating link state protocol node in a network, a local link state database that is a portion of a network link state database of the network; receiving, by the partially-participating link state protocol node on a first interface, a link state protocol data unit (LSP); and sending the particular LSP from a second interface of the partially-participating link state protocol node without updating the local link state database based on the particular LSP.

One embodiment includes determining that the particular LSP does not pertain to the partially-participating link state protocol node. In one embodiment, the link state protocol is Intermediate System to Intermediate System (IS-IS). In one embodiment, the network is an IEEE 802.1aq Shortest Path Bridging (SPB) network. In one embodiment, the partially-participating link state protocol node is configured to maintain in the local link state database only its own LSPs. One embodiment includes generating and sending an LSP and not to wait for an acknowledgement of said sent particular own LSP.

One embodiment includes a method, comprising: maintaining, by a partially-participating link state protocol node in a network, a local link state database that is a portion of a network link state database of the network; receiving, by the partially-participating link state protocol node on a first interface, a link state protocol data unit (LSP); and sending an acknowledgment of the particular LSP from the first interface in response to the partially-participating link state protocol node not having another interface currently participating in the link state protocol distribution.

One embodiment includes determining that the particular LSP does not pertain to the partially-participating link state protocol node. In one embodiment, the link state protocol is Intermediate System to Intermediate System (IS-IS). In one embodiment, the network is an IEEE 802.1aq Shortest Path Bridging (SPB) network. In one embodiment, the partially-participating link state protocol node is configured to maintain in the local link state database only its own LSPs. One embodiment includes: sending an LSP advertising a particular one of its own LSPs and not to wait for an acknowledgement of said sent particular own LSP.

FIG. 1 illustrates network 100 operating according to one embodiment. Network 100 includes full functionality link state protocol nodes 101-104 and limited functionality link state protocol nodes 111-112 and 121-124. In one embodiment, each of nodes 101-104, 111-112 and 121-124 is a router or a bridge, and may have attached zero or more end station devices 131-140.

Each of nodes 101-104 operate a full implementation of a link state protocol, such as, but not limited to, Intermediate System to Intermediate System (IS-IS), including maintaining a full link state database of the network and periodically advertising its stored information.

Each of nodes 111-112 and 121-124 operates a limited functionality implementation of a link state protocol, such as, but not limited to, Intermediate System to Intermediate System (IS-IS), including maintaining a link state database for information related to itself, but not for the entire network. Each of nodes 111-112 and 121-124 operates so that each of full functionality link state protocol nodes 101-104 seamlessly acquires connectivity/link state information about the entire network 100.

In one embodiment, each of limited functionality link state protocol nodes 111-112 and 121-124 is an intermediate system node doing IS-IS protocol with no more than two connections to other intermediate systems, and only persistently maintains a portion of the link state database (e.g., about his own information in his link state database). Each of limited functionality link state protocol nodes 111-112 and 121-124 participates in some, but not all, IS-IS communication and processing operations, but rather does so without doing a lot of processing and not persistently maintaining link state information about other nodes (e.g., except for connectivity to neighboring link state nodes)

In one embodiment, each of limited functionality link state protocol nodes 111-112 and 121-124 has no more than two active external ports to other IS-IS participating nodes, spanning tree bridges, hubs, or anything else other than an end station. Also, each node of limited functionality link state protocol nodes may have any number of ports to end stations, whether external or internal to the node.

In one embodiment, each of limited functionality link state protocol nodes 111-112 and 121-124 stops and processes the appropriate level (as configured, Level 1, Level 2, or both) of IS-IS Link State Protocol Data Units (LSPs)

In one embodiment, each of limited functionality link state protocol nodes 111-112 and 121-124 transmits, receives, and processes Shortest Path Bridging (SPB) Hello Protocol Data Units (PDUs) to create an ISIS Adjacency Database of its neighbors.

In one embodiment, each of limited functionality link state protocol nodes 111-112 and 121-124 maintains only its own Link State Protocol Data Units (LSPs) in its Link State Database.

In one embodiment, each of limited functionality link state protocol nodes 111-112 and 121-124 does not follow the standard IS-IS update process for handling LSPs received from other nodes. In one embodiment, each of limited functionality link state protocol nodes 111-112 and 121-124 operates according to the flow diagram of FIG. 4 or some variant thereof.

In one embodiment, each of limited functionality link state protocol nodes 111-112 and 121-124 only send LSPs/partial sequence number protocol data unit (PSNP) in response to a received LSP. One exception is when a node 111-112 and 121-124 generates a new version of a local LSP (e.g., as a result of a local adjacency change). In one embodiment, when an LSP is flooded, the SRM bit is cleared after transmission without waiting for an acknowledgment. Retransmissions, if necessary, will be triggered by receipt of a PSNP (e.g., originated by a full-functionality links state protocol node 101-104).

In one embodiment, each of limited functionality link state protocol nodes 111-112 and 121-124 does not send a complete sequence number PDU (CSNP) when an adjacency first comes up.

In one embodiment, each of limited functionality link state protocol nodes 111-112 and 121-124 processes normally, as per ISO 10589, an LSP is received whose ID matches itself except that the SRM bit(s) are cleared after transmission so as not to wait for an acknowledgement. If the received LSP matches the copy in the local database, an acknowledgment message (PSNP) is sent on the circuit on which the LSP was received. If the received LSP is older than the copy in the local database, the newer version is sent on the circuit on which the older LSP was received. If the received LSP is newer than the copy in the local database, a new version of the local LSP is generated and flooded to all neighbors. If the received LSP is no longer in the local database, the LSP is purged and the purge is advertised on the circuit on which the LSP was received.

In one embodiment, each of limited functionality link state protocol nodes 111-112 and 121-124 processes a received LSP is received whose ID does not matches itself as follows. If the node has an IS-IS neighbor in the UP state on the circuit on which the LSP was NOT received, the LSP is flooded once on that circuit (i.e. "pass-through behavior"). If the node does NOT have a neighbor in the UP state on the circuit on which the LSP was NOT received, the node sends an acknowledgment message (PSNP) on the circuit on which the LSP was received. This prevents endless retransmissions of the LSP.

In one embodiment, each of limited functionality link state protocol nodes 111-112 and 121-124 processes a received CSNP as follows. Entries referring to LSPs generated by the local system are processed normally (as per ISO 10589) (e.g. locally generated LSPs are flooded/purged on the circuit on which the CSNP was received as required. The CSNP is 'passed-through" to the neighbor on the other circuit if present.

In one embodiment, when passing through the CSNP the source-id of the CSNP is changed to the ID of the local system. No changes are made to the body of the PDU—even in cases where the content refers to local LSPs.

In one embodiment, each of limited functionality link state protocol nodes 111-112 and 121-124 processes a received PSNP as follows. Entries referring to LSPs generated by the local system are processed normally (as per ISO 10589). If there are entries referring to LSPs generated by other systems and the node has a neighbor in the UP state on the circuit on which the PSNP was not received, the PSNP is passed through. When doing so the source-id is changed to that of the local system and any entries referring to LSPs generated by the local system are removed.

Figure 2A:
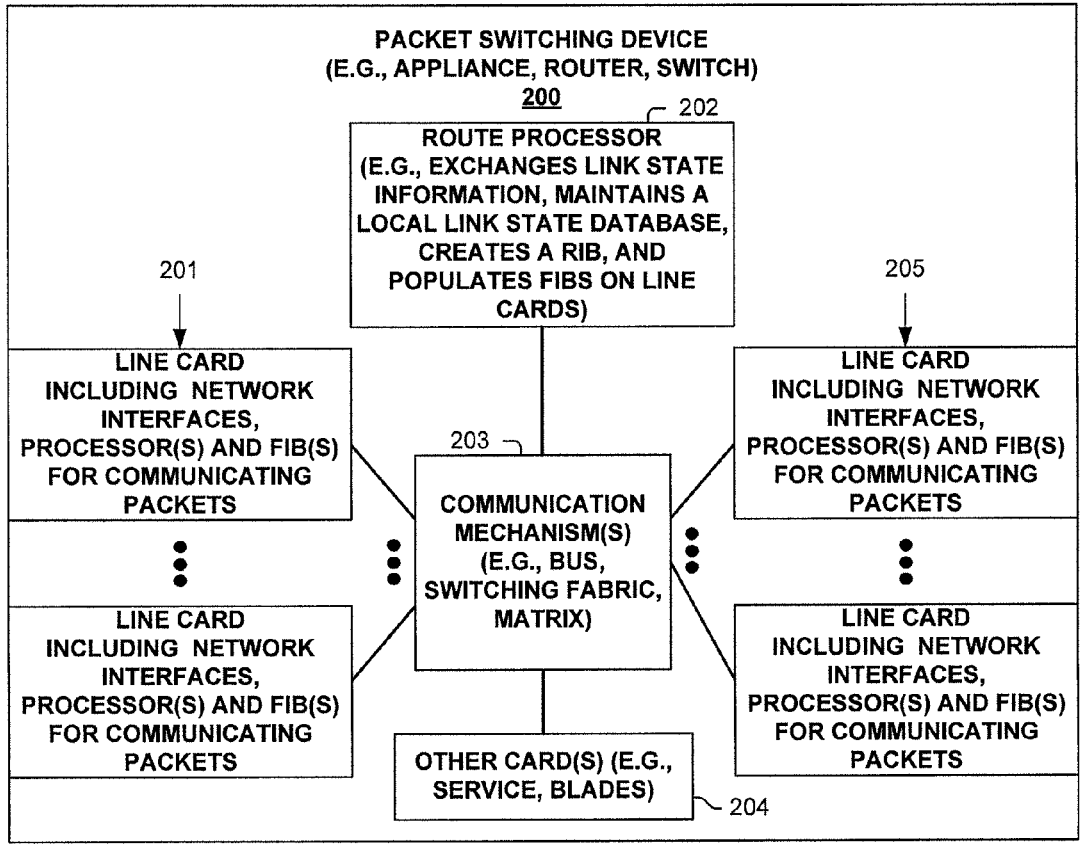
FIG. 2A illustrates a packet switching device according to one embodiment.

One embodiment of a packet switching device 200 (e.g., a limited functionality link state protocol node) is illustrated in FIG. 2A. As shown, packet switching device 200 includes multiple line cards 201 and 205, each with one or more network interfaces for sending and receiving packets over communications links (e.g., link state protocol and data packet), and with one or more processing elements. Packet switching device 200 also has a control plane with one or more processing elements 202 for managing the control plane and/or control plane processing of packets associated with a limited functionality link state protocol node. Packet switching device 200 also includes other cards 204 (e.g., service cards, blades) which include processing elements that are used in one embodiment to process packets associated with a limited functionality link state protocol node, and some communication mechanism 203 (e.g., bus, switching fabric, matrix) for allowing its different entities 201, 202, 204 and 205 to communicate.

Figure 2B:
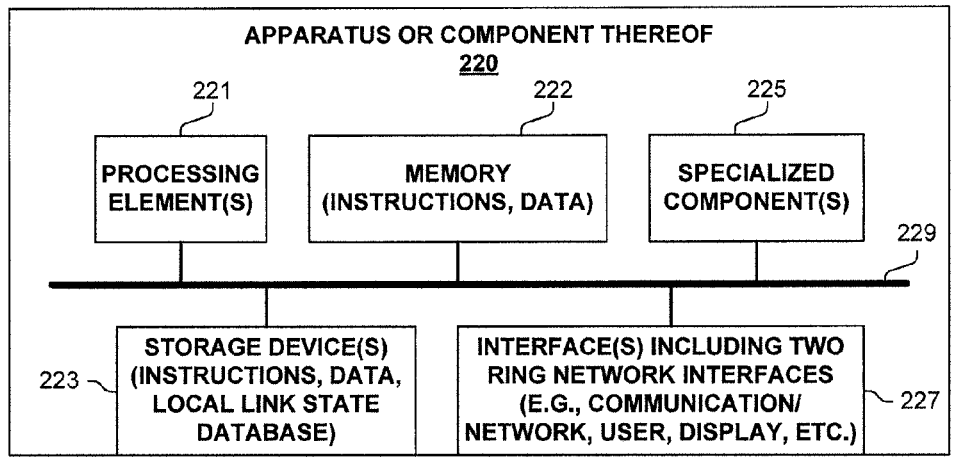
FIG. 2B illustrates an apparatus according to one embodiment.

FIG. 2B is a block diagram of an apparatus 220 used in one embodiment associated with a limited functionality link state protocol node. In one embodiment, apparatus 220 performs one or more processes, or portions thereof, corresponding to one of the flow, network, or other diagrams illustrated or otherwise described herein, and/or illustrated in another diagram or otherwise described herein.

In one embodiment, apparatus 220 includes one or more processing element(s) 221, memory 222, storage device(s) 223, specialized component(s) 225 (e.g. optimized hardware such as for performing lookup and/or packet processing operations, etc.), and interface(s) 227 for communicating information (e.g., sending and receiving link state and data packets, user-interfaces, displaying information, etc.), which are typically communicatively coupled via one or more communications mechanisms 229, with the communications paths typically tailored to meet the needs of a particular application.

Various embodiments of apparatus 220 may include more or fewer elements. The operation of apparatus 220 is typically controlled by processing element(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processing element(s) 221 and/or data which is manipulated by processing element(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processing element(s) 221 and/or data which is manipulated by processing element(s) 221 for implementing functionality in accordance with an embodiment.

Figure 3:
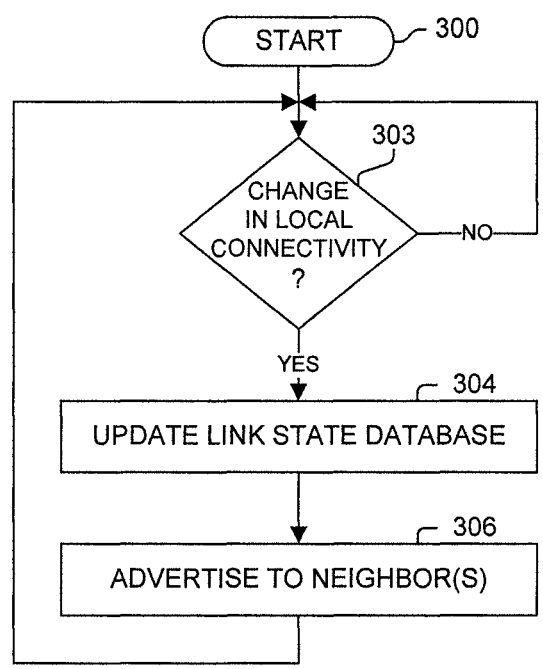
FIG. 3 illustrates a process according to one embodiment.

FIG. 3 illustrates a process performed in one embodiment by a limited functionality link state protocol node. Processing begins with process block 300. Processing loops at process block 303 until there is a change to its local connectivity. Then, in process blocks 304 and 306, the local link state database is updated with this new information advertised (e.g., in an LSP) to its neighbor(s). Processing returns to process block 303.

Figure 4:
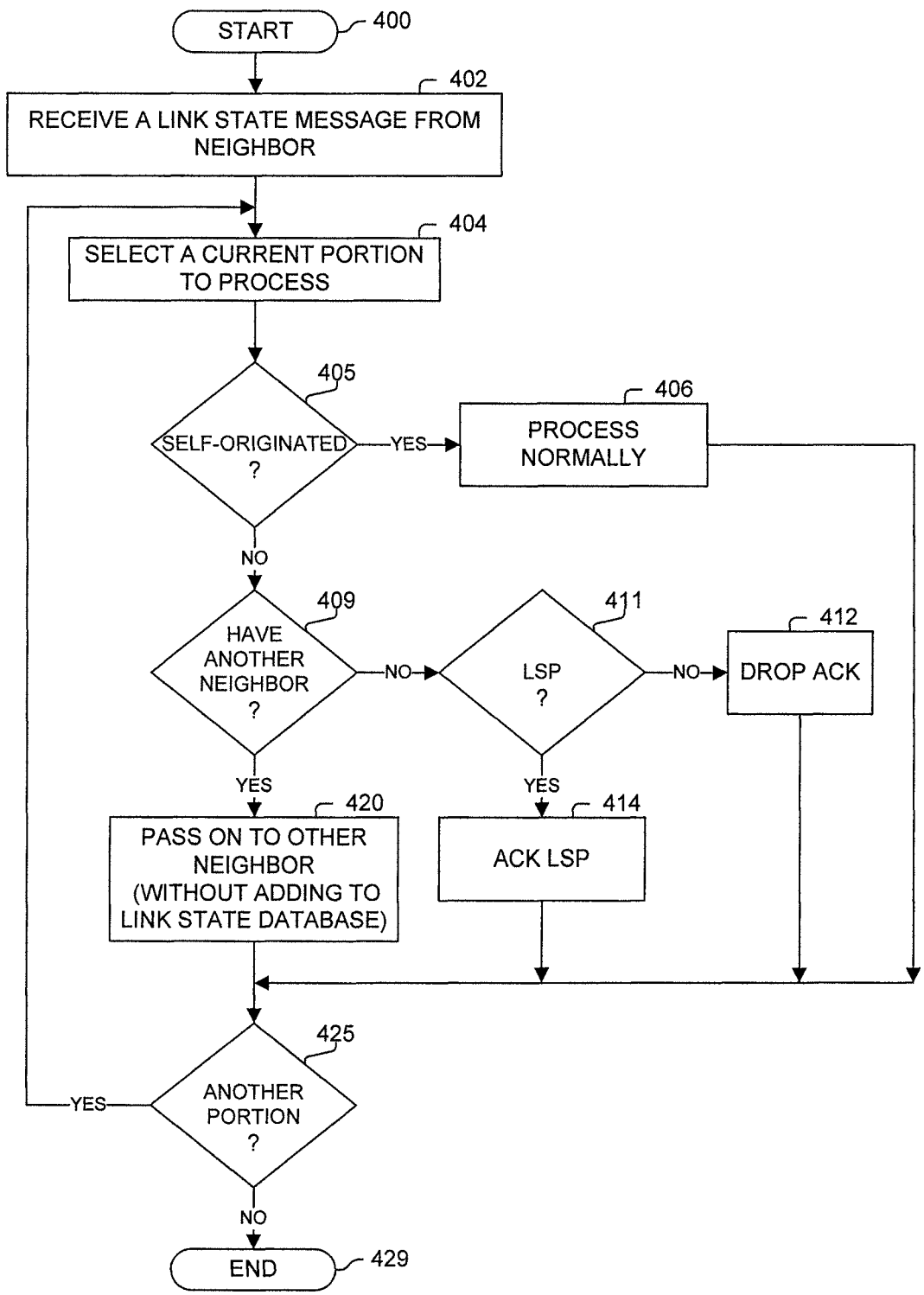
FIG. 4 illustrates a process according to one embodiment.

FIG. 4 illustrates a process performed in one embodiment by a limited functionality link state protocol node. Processing begins with process block 400. In process block 402, the limited functionality link state protocol node receives a link state message (e.g., with one or more LSPs) from a neighbor. In process block 404, a current portion of the link state message is selected. As determined in process block 405, if the current portion pertains to the limited functionality link state protocol node (e.g., it was self-originated—the limited functionality link state protocol node), then in process block 406, this information is processed normally (e.g., according to an IS-IS standard implementation). Otherwise, the current portion is not about the limited functionality link state protocol node, and processing proceeds to process block 409.

As determined in process block 409, if the limited functionality link state protocol node does not have a second adjacent link state protocol node (e.g., a link state protocol participating node different than the link state protocol node from which the link state message was received), then processing proceeds to process block 411. If the current portion is an LSP, then in process block 414, an acknowledgment is sent (e.g., in due course) to the link state protocol node from which the link state message was received; otherwise, the current portion is an acknowledgement which is dropped. Processing proceeds to process block 425.

Otherwise, as determined in process block 409, the limited functionality link state protocol node does have a second adjacent link state protocol node (e.g., a link state protocol participating node different than the link state protocol node from which the link state message was received) and processing proceeds to process block 420. In process block 420, the received current portion (e.g., an LSP) is passed on to the other neighbor (e.g., without the limited functionality link state protocol node updating its local link state database accordingly). Processing proceeds to process block 425.

As determined in process block 425, if the received link state message has additional portions to process, then processing of the flow diagram returns to process block 404 to select a next portion to process. Otherwise, as determined in process block 425, processing of the flow diagram of FIG. 4 is complete as indicated by process block 429.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A partially-participating link state protocol node, comprising:
    storage storing a local link state database;
    one or two interfaces sending and receiving link state protocol packets; and
    one or more processing elements and memory;
    wherein the partially-participating link state protocol node maintains the local link state database that is a portion of a network link state database of the network related to the partially-participating link state protocol node, but not the entire network as maintained by a network node operating a full implementation of a link state protocol, which includes the partially-participating link state protocol node only updating the local link state database based on link state protocol data units (LSPs) received in a link state protocol packets on an interface of said one or two interfaces in response to determining that said LSPs were originated by the partially-participating link state protocol node.

2. The partially-participating link state protocol node of claim 1, wherein the link state protocol is Intermediate System to Intermediate System (IS-IS).

3. The partially-participating link state protocol node of claim 2, wherein the network is an IEEE 802.1aq Shortest Path Bridging (SPB) network.

4. The partially-participating link state protocol node of claim 1, wherein said one or two interfaces consists of exactly two interfaces currently sending and receiving link state protocol packets.

5. The partially-participating link state protocol node of claim 1, wherein said one or two interfaces consists of exactly one interface currently sending and receiving link state protocol packets.

6. A method, comprising:
    maintaining, by a partially-participating link state protocol node in a network, a local link state database that is a portion of a network link state database of the network related to the partially-participating link state protocol node, but not the entire network as maintained by a network node operating a full implementation of a link state protocol, with the partially-participating link state protocol node being connected to exactly two other intermediate nodes operating a partial or full implementation of the link state protocol via a first interface and a second interface;
    receiving, by the partially-participating link state protocol node on the first interface, a particular link state protocol data unit (LSP); and
    sending the particular LSP from the second interface of the partially-participating link state protocol node without updating the local link state database based on the particular LSP in response to determining that the particular LSP was not originated by the partially-participating link state protocol node.

7. The method of claim 6, wherein the link state protocol is Intermediate System to Intermediate System (IS-IS).

8. The method of claim 6, wherein the network is an IEEE 802.1aq Shortest Path Bridging (SPB) network.

9. A method, comprising:
    maintaining, by a partially-participating link state protocol node in a network, a local link state database that is a portion of a network link state database of the network related to the partially-participating link state protocol node, but not the entire network as maintained by a network node operating a full implementation of a link state protocol, with the link being connected to exactly one other intermediate node operating a partial or full implementation of the link state protocol via a first interface;
    receiving, by the partially-participating link state protocol node on the first interface, a particular link state protocol data unit (LSP); and
    sending an acknowledgment of the particular LSP from the first interface without updating the local link state database based on the particular LSP in response to determining that the particular LSP was not originated by the partially-participating link state protocol node and the partially-participating link state protocol node not having another interface currently participating in the link state protocol.

10. The method of claim 9, wherein the link state protocol is Intermediate System to Intermediate System (IS-IS).

11. The method of claim 9, wherein the network is an IEEE 802.1aq Shortest Path Bridging (SPB) network.

* * * * *